Jan. 24, 1939.  I. M. MORRIS  2,145,188
CULTIVATOR
Filed Oct. 21, 1937   3 Sheets-Sheet 1
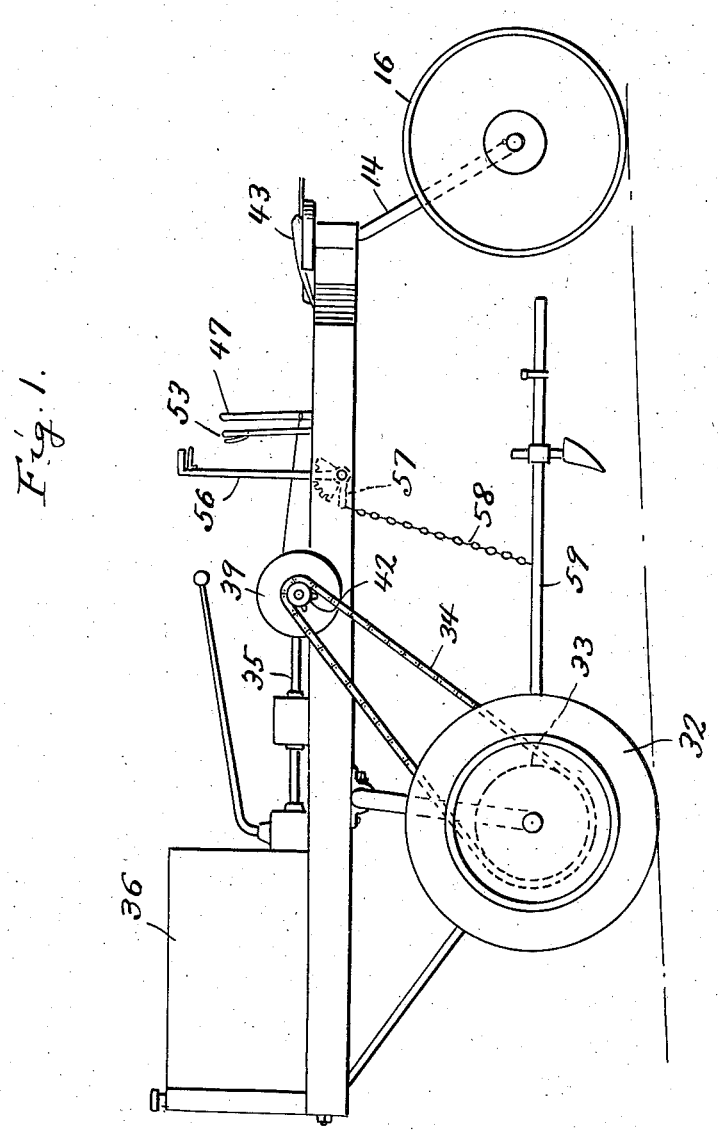
Inventor
I. M. Morris
By Clarence A. O'Brien
Hyman Berman
Attorneys

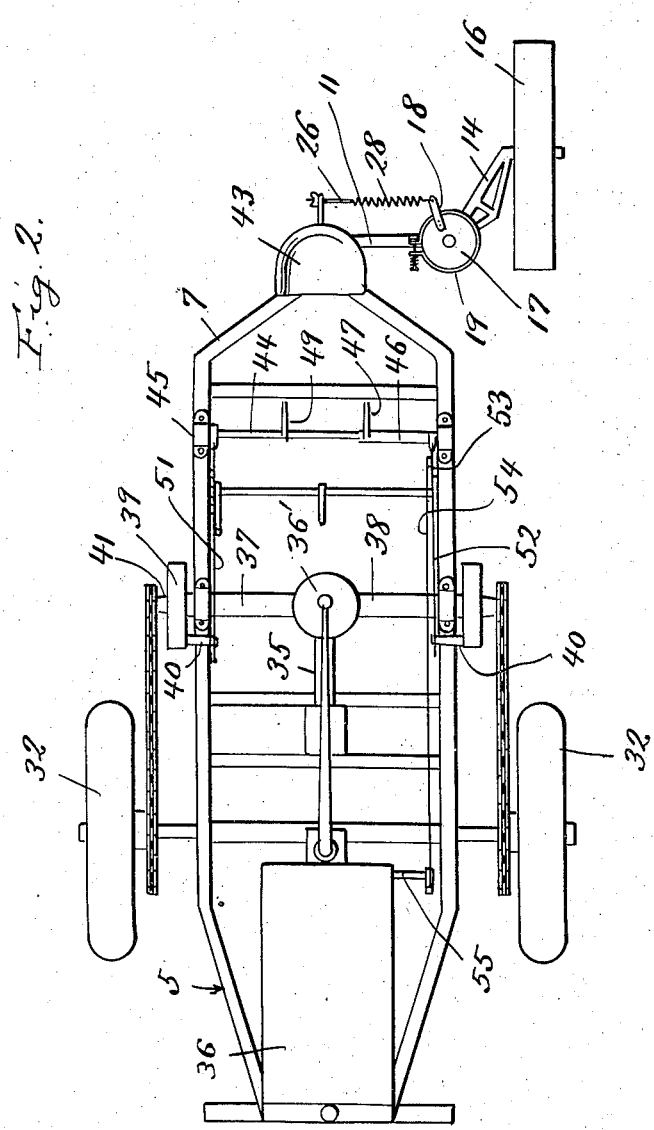

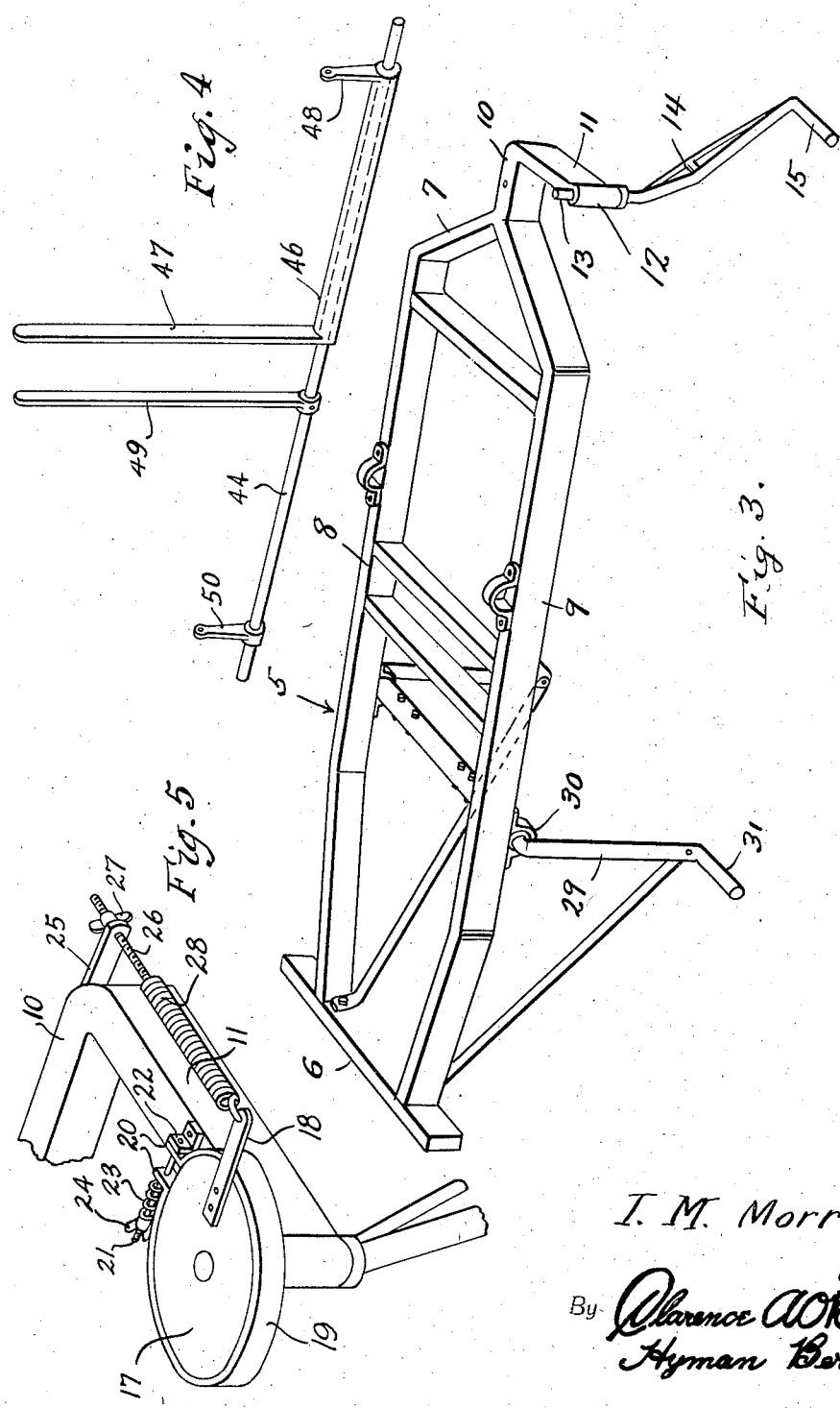

Patented Jan. 24, 1939

2,145,188

UNITED STATES PATENT OFFICE 2,145,188

CULTIVATOR

Irwin M. Morris, Esom Hill, Ga.

Application October 21, 1937, Serial No. 170,270

1 Claim. (Cl. 180—17)

This invention appertains to new and useful improvements in agricultural machinery and more particularly to a novel cultivator machine.

The principal object of the present invention is to provide a cultivator machine having a rear idler wheel which will not interfere with the crops being cultivated.

Another important object of the invention is to provide a cultivator having means whereby it can be readily steered without the employment of steerable wheels.

These and various other important objects and advantages of the invention will become apparent to the reader of the following specification.

In the drawings:

Figure 1 represents a side elevational view of the machine.

Figure 2 is a top plan view of the machine.

Figure 3 is a perspective view of the chassis.

Figure 4 is a perspective view of the steering lever assembly.

Figure 5 is a fragmentary perspective view of the idler wheel mount and control means.

Referring to the drawings wherein like numerals designate like parts, it can be seen in Figure 3 that numeral 5 generally refers to the chassis which consists of a pair of end members 6—7 and the longitudinally extending side bars 8—9. The end member 7 is of substantially Y-shape, the leg portion 10 of which is bent laterally as at 11 and provided with a bearing formation 12 through which the upper end portion or shank 13 of the depending fabricated frame 14 is journaled. The lower end of this frame 14 is provided with a laterally disposed axle 15 disposed into the idler wheel 16. Thus the idler wheel is swivelly connected to the chassis frame 5 and disposed laterally with respect thereto by the laterally disposed leg portion 11 of the frame end 7.

For equalizing the position of the idler wheel and holding the same in proper position laterally of the vehicle at the rear thereof, the upper end of the shank 13 is provided with a drum 17 suitably secured thereto and this drum is provided at its top side with a laterally disposed arm 18. A brake band 19 is disposed around the periphery of the drum 17 and has the ear-like end portions 20 with the bolt 21 disposed therethrough and through the lug 22 on the leg portion 11. A spring 23 is provided on this bolt 21 along with the wing nut 24 and by tightening the wing nut 24 on the bolt and against the braking action of the spring 23, the tension of the band 19 on the drum 17 can be regulated.

An arm 25 extends rearwardly from the leg 10 and has an opening for receiving the eye-bolt 26. This eye-bolt is provided with a wing nut 27 and is connected to the coiled extensible spring 28 at one end thereof while its opposite end is connected to the outer end of the arm 18. The idler wheel being positioned laterally of the longitudinal axis of the chassis will tend to cause the tractor cultivator to travel to the left when the drum is free and to compensate for this tendency, the spring 28 is employed which acts to hold the idler wheel in a position to bring about travel of the tractor cultivator in a substantially straight course. It is to be understood that when the tractor cultivator is under load, the brake band is adjusted to free the brake drum so that the idler wheel may swing freely except for the action of the spring 28 tending to prevent said idler wheel from assuming a position that would bring about guiding of the tractor cultivator to the left. When the tractor cultivator is not under load, the brake drum is secured by the brake band to prevent free swinging movement of the idler wheel, the idler wheel being held in a position to steer the tractor in a straight course. The tractor cultivator when not under load and if the idler wheel were free to swing would whip at the rear end thereof.

An arched-shaped axle 29 is disposed through the bearing 30 on the bottom side of the frame 5, the trunnion portions 31 thereof being disposed into the front wheels 32—32. These wheels 32—32 are provided with sprocket wheels 33 over which the drive sprocket chains 34 are trained.

As can be seen in Figure 2, numeral 35 represents the drive line from the motor 36 on the chassis frame 5 and this extends to the differential 36'. Extending laterally from the differential 36' are the shafts 37—38 connected to brake drums at opposite sides of the frame 5. Inside of these brake drums 39 are expanding shoes controlled by the external levers 40.

The drums 39 carry stub axles 41 on which are small sprocket wheels 42 over which the chains 34 are trained.

In front of the operator's seat 43 is the shaft 44 having its ends journaled through bearings 45 on the side rails 8—9 of the frame 5. Furthermore on this shaft 44 is the sleeve 46 adjacent one end of the shaft and this sleeve is provided with the upstanding hand lever 47 at one end and the small arm 48 at its opposite end. Adjacent the hand lever 47, the shaft 44 has attached thereto the hand lever 49 and at the adjacent end of the shaft 44 is the small arm 50. From the arm 50 extends the control wire 51 to the brake arm 40 while from the arm 48 extends the control wire 52 to the brakes on the left side of the vehicle. Thus it can be seen, that whenever a turn of the vehicle is desired, all that is necessary is to apply the brakes on that particular side of the vehicle, thus stopping the wheel on that side and allowing the wheel on the other side to pivot the machine.

The hand lever 53 has the wire 54 extending therefrom to the clutch control 55.

A hand bar and detent 56 including an arm 57 has a chain 58 extending downwardly therefrom and attached to the swingable cultivator element carrier 59 so as to regulate the height of the earth engaging element with respect to the ground.

While the foregoing specification sets forth the invention in specific terms, it is to be understood that numerous changes in the shape, size and materials may be resorted to without departing from the spirit and scope of the invention as claimed.

Having described the invention, what is claimed as new is:

A tractor cultivator comprising an elongated chassis including end and side members and one of said end members being of substantially Y-shape providing a leg portion having a part thereof disposed at right angles and terminating in alignment with one of the side members and shaped to provide a bearing portion, an axle mounted on said chassis, traction wheels journaled on the axle, power drive means on the chassis for driving the traction wheels simultaneously or one independently of the other, a fabricated axle journaled in the bearing portion of said leg portion of the Y-shaped end member and having an angularly disposed portion forming an axle spindle disposed rearwardly of one of the traction wheels and laterally of one of the side members of the chassis, an idler wheel journaled on the axle spindle, a brake drum secured to the fabricated axle, a brake band carried by the chassis and co-acting with the drum to secure and free said drum whereby the fabricated axle may be secured against movement to prevent swinging of the idler wheel and freed to permit swinging of said idler wheel, and a spring means between the drum and chassis for yieldably limiting the rotation of the drum in one direction when the drum is freed of the brake band.

IRWIN M. MORRIS.